United States Patent
Asada

(10) Patent No.: US 10,224,008 B2
(45) Date of Patent: Mar. 5, 2019

(54) IMAGE DISPLAY SYSTEM, IMAGE DISPLAY METHOD, AND DISPLAY DEVICE

(71) Applicant: Clarion Co., Ltd., Saitama-shi, Saitama (JP)

(72) Inventor: Katsuya Asada, Ebina (JP)

(73) Assignee: Clarion Co., Ltd., Saitama-shi (JP)

( * ) Notice: Subject to any disclaimer, the term of this patent is extended or adjusted under 35 U.S.C. 154(b) by 12 days.

(21) Appl. No.: 15/328,581

(22) PCT Filed: Jun. 26, 2015

(86) PCT No.: PCT/JP2015/068555
§ 371 (c)(1),
(2) Date: Jan. 24, 2017

(87) PCT Pub. No.: WO2016/013349
PCT Pub. Date: Jan. 28, 2016

(65) Prior Publication Data
US 2017/0221453 A1 Aug. 3, 2017

(30) Foreign Application Priority Data
Jul. 25, 2014 (JP) .................................. 2014-151994

(51) Int. Cl.
*G09G 5/373* (2006.01)
*G06F 3/14* (2006.01)
(Continued)

(52) U.S. Cl.
CPC ............. *G09G 5/373* (2013.01); *G06F 3/048* (2013.01); *G06F 3/1454* (2013.01); *G09G 5/00* (2013.01);
(Continued)

(58) Field of Classification Search
CPC ....... G09G 2320/0693; G09G 2310/04; G09G 2340/0407
(Continued)

(56) References Cited

U.S. PATENT DOCUMENTS

| 8,847,746 B2 * | 9/2014 | Oh | G01C 21/3688 340/441 |
| 2003/0156097 A1 * | 8/2003 | Kakihara | G01C 21/3667 345/156 |

(Continued)

FOREIGN PATENT DOCUMENTS

| JP | 2006-229781 A | 8/2006 |
| JP | 2007-124275 A | 5/2007 |

(Continued)

OTHER PUBLICATIONS

International Search Report (PCT/ISA/210) issued in PCT Application No. PCT/JP2015/068555 dated Sep. 29, 2015 with English translation (three pages).

(Continued)

*Primary Examiner* — Kimberly A Williams
(74) *Attorney, Agent, or Firm* — Crowell & Moring LLP

(57) ABSTRACT

An image display system includes: a display device; and an information terminal, the display device having: a display control unit that generates a first display image having size adjustment regions added thereto, based on a video signal outputted by the information terminal; and an image transmitter that outputs the first display image generated by the display control unit to the information terminal; the information terminal having: a video output unit that outputs the video signal to the display device; a screen adjustment information acquisition unit that acquires screen adjustment information used by the display control unit to generate a display screen to be displayed on the display device, based on the first display image transmitted by the image trans- (Continued)

mitter; and an information transmitter that transmits the screen adjustment information acquired by the screen adjustment information acquisition unit to the display device, wherein the display control unit generates a second display image, based on the screen adjustment information transmitted by the information transmitter.

11 Claims, 13 Drawing Sheets

(51) Int. Cl.
G06F 3/048 (2013.01)
G09G 5/00 (2006.01)
G09G 5/02 (2006.01)
G09G 5/10 (2006.01)
G09G 5/36 (2006.01)
H04N 5/66 (2006.01)

(52) U.S. Cl.
CPC .............. *G09G 5/02* (2013.01); *G09G 5/10* (2013.01); *G09G 5/36* (2013.01); *H04N 5/66* (2013.01); *G09G 2310/0232* (2013.01); *G09G 2320/0693* (2013.01); *G09G 2340/0442* (2013.01)

(58) Field of Classification Search
USPC ........................................................ 345/660
See application file for complete search history.

(56) References Cited

U.S. PATENT DOCUMENTS

| | | | |
|---|---|---|---|
| 2010/0223276 A1* | 9/2010 | Al-Shameri | G06F 17/30333 707/769 |
| 2012/0157065 A1* | 6/2012 | Yoshikawa | G01C 21/367 455/414.2 |
| 2014/0092047 A1 | 4/2014 | Nara et al. | |
| 2014/0185090 A1* | 7/2014 | Ohata | G06K 15/002 358/1.15 |
| 2014/0314301 A1* | 10/2014 | Azar | G06K 9/0014 382/133 |
| 2015/0029195 A1* | 1/2015 | Ito | G06F 3/1462 345/441 |
| 2015/0109262 A1* | 4/2015 | Nagao | G06F 3/038 345/178 |
| 2015/0205396 A1* | 7/2015 | Konishi | G06F 3/0488 345/173 |
| 2016/0112667 A1* | 4/2016 | Park | G06F 1/1601 348/739 |
| 2017/0169568 A1* | 6/2017 | Azar | G06T 7/0012 |

FOREIGN PATENT DOCUMENTS

| WO | WO 2012/141294 A1 | 10/2012 |
|---|---|---|
| WO | WO 2013/118197 A1 | 8/2013 |

OTHER PUBLICATIONS

Japanese-language Written Opinion (PCT/ISA/237) issued in PCT Application No. PCT/JP2015/068555 dated Sep. 29, 2015 (three pages).

* cited by examiner

FIG.3
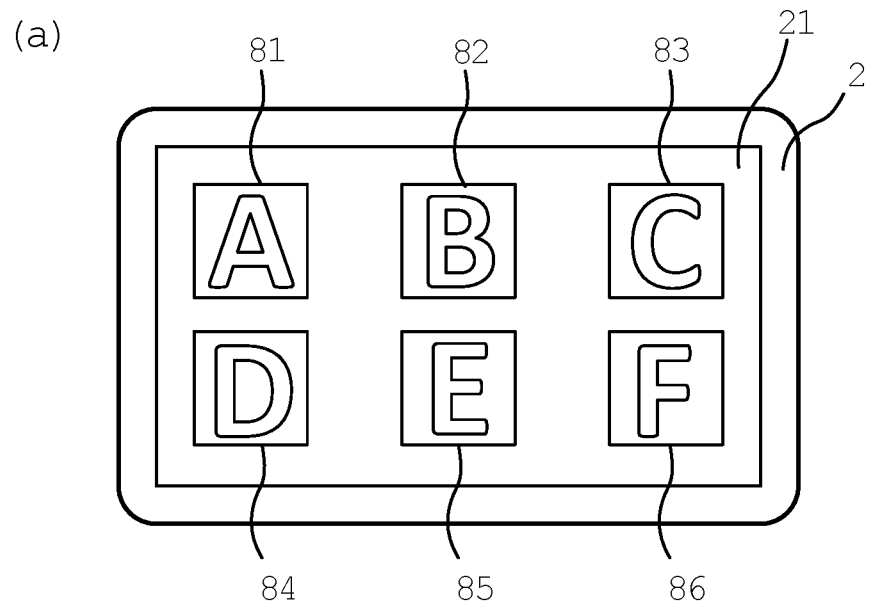
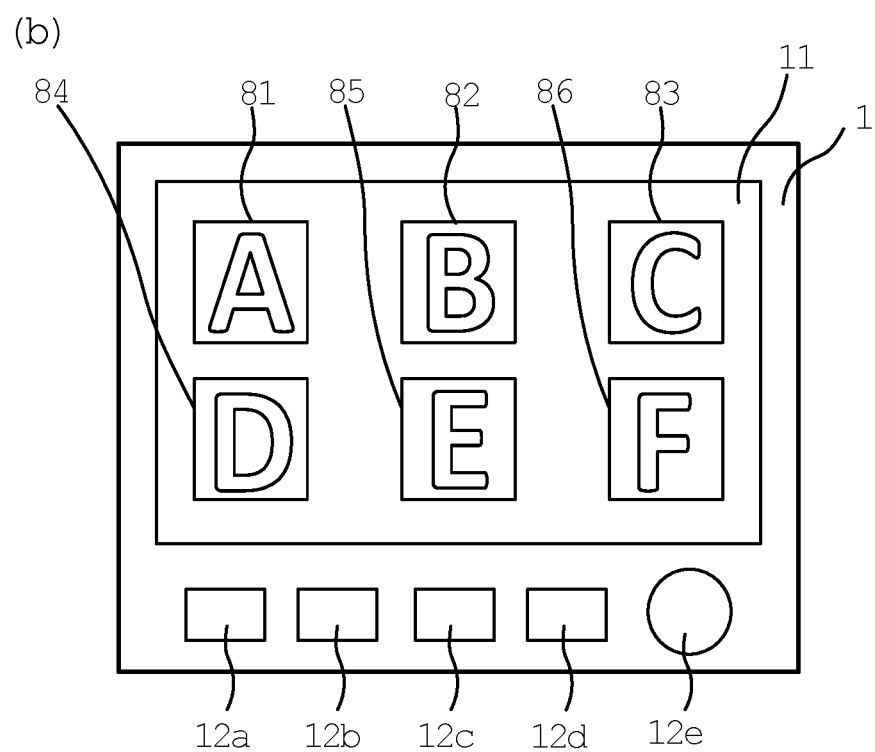

FIG.5
(a)
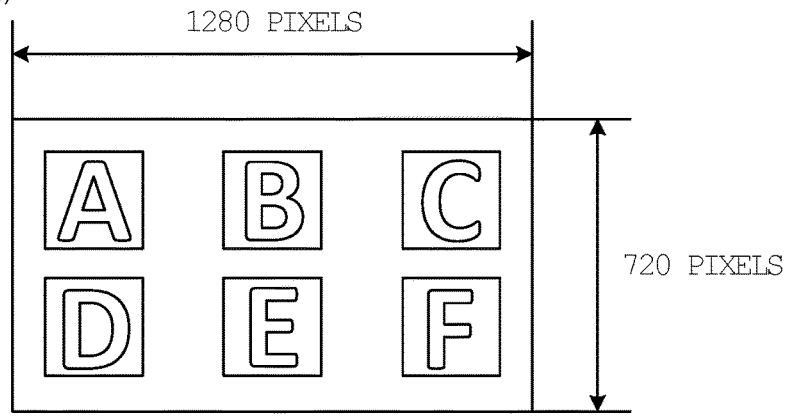
(b)
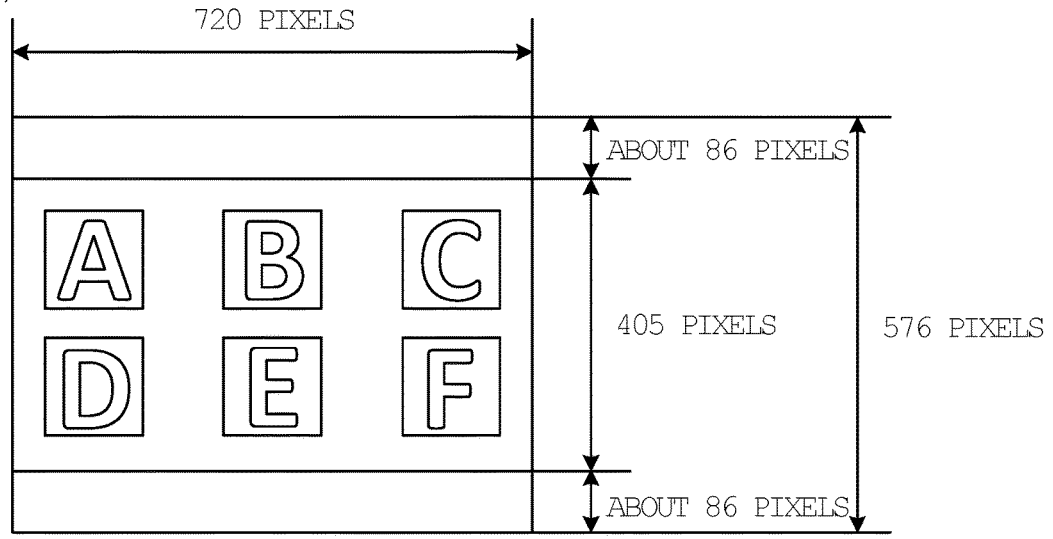

FIG.6

| IDENTIFICATION INFORMATION OF IN-VEHICLE DEVICE | | * * * * |
|---|---|---|
| IDENTIFICATION INFORMATION OF PORTABLE TERMINAL | | * * * * |
| WIDTH OF BLACK STRIP REGION | TOP END SIDE | * * * * |
| | BOTTOM END SIDE | * * * * |
| | LEFT END SIDE | * * * * |
| | RIGHT END SIDE | * * * * |

FIG.9

| IDENTIFICATION INFORMATION OF IN-VEHICLE DEVICE | | * * * * |
|---|---|---|
| IDENTIFICATION INFORMATION OF PORTABLE TERMINAL | | * * * * |
| IDENTIFICATION INFORMATION OF APPLICATION | | * * * * |
| WIDTH OF BLACK STRIP REGION | TOP END SIDE | * * * * |
| | BOTTOM END SIDE | * * * * |
| | LEFT END SIDE | * * * * |
| | RIGHT END SIDE | * * * * |

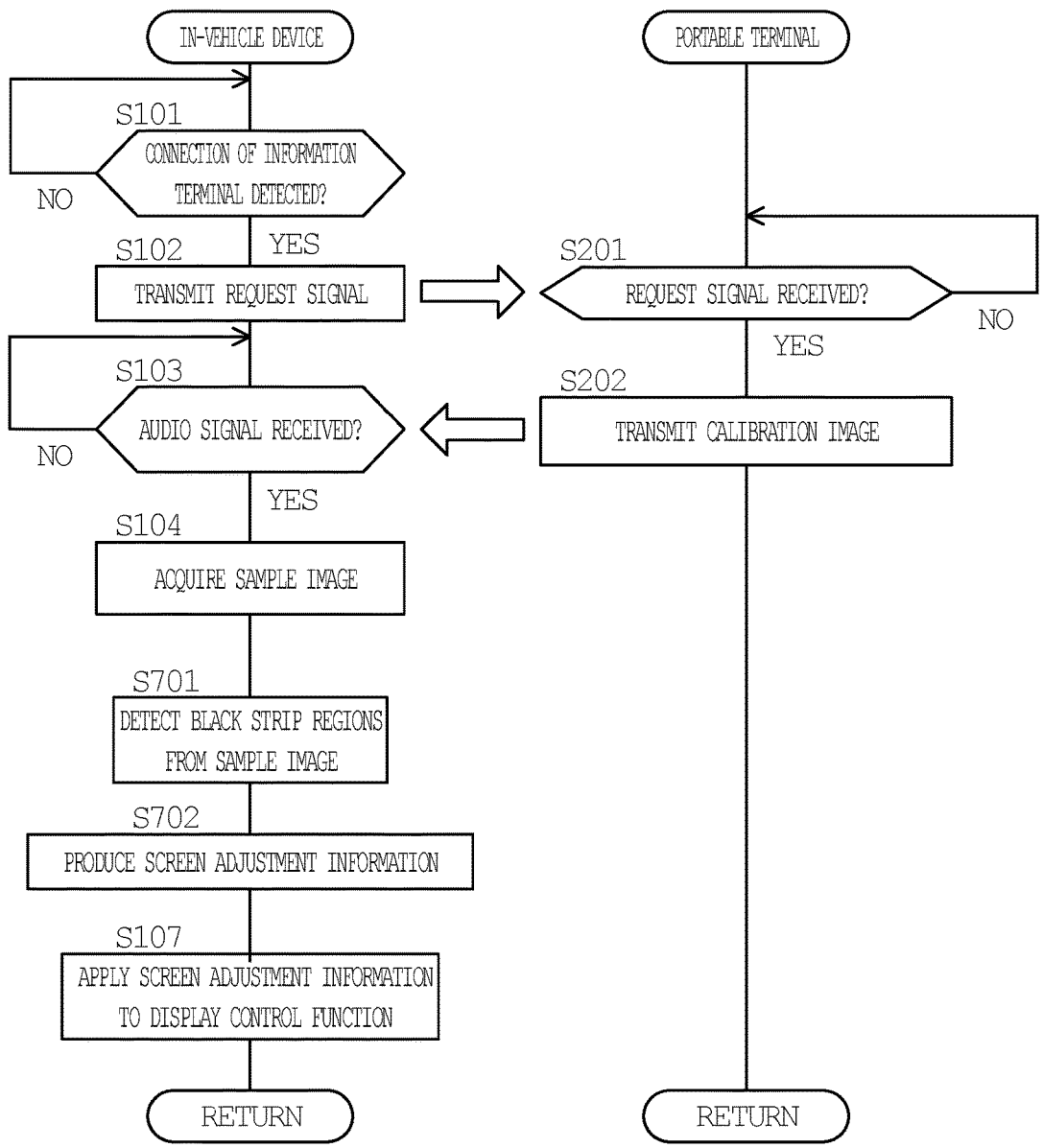

IMAGE DISPLAY SYSTEM, IMAGE DISPLAY METHOD, AND DISPLAY DEVICE

TECHNICAL FIELD

The present invention relates to an image display system, an image display method, and a display device used for the image display system.

BACKGROUND ART

Conventionally, if an aspect ratio of a video signal is different from an aspect ratio of a display unit in displaying a video based on the video signal on the display unit, a screen size is adjusted by adding black strip regions on top and bottom or on right and left of the video. PTL1 describes a video converter that detects black strip regions on the basis of a brightness level of an input video signal and expands the video after removal of the black strip regions so as to display a video with no black strips on the display unit.

CITATION LIST

Patent Literature

PTL1: Japanese Laid-Open Patent Publication No. 2006-229781

SUMMARY OF INVENTION

Technical Problem

In the approach described in PTL1, dark parts in a video to be displayed or other parts can be falsely detected as black strips. Thereby, black strip regions to be removed vary from frame to frame, which causes repetition of expansion and contraction of the video during playback. This may make the user uncomfortable.

Solution to Problem

According to the 1st aspect of the present invention, an image display system comprises: a display device; and an information terminal, the display device having: a display control unit that generates a first display image having size adjustment regions added thereto, based on a video signal outputted by the information terminal; and an image transmitter that outputs the first display image generated by the display control unit to the information terminal; the information terminal having: a video output unit that outputs the video signal to the display device; a screen adjustment information acquisition unit that acquires screen adjustment information used by the display control unit to generate a display screen to be displayed on the display device, based on the first display image transmitted by the image transmitter; and an information transmitter that transmits the screen adjustment information acquired by the screen adjustment information acquisition unit to the display device, wherein the display control unit generates a second display image, based on the screen adjustment information transmitted by the information transmitter.

According to the 2nd aspect of the present invention, in the image display system according to the 1st aspect, it is preferred that the display control unit generates the first display image before receiving the screen adjustment information from the information terminal, and generates the second display image as the display screen after receiving the screen adjustment information from the information terminal, wherein the size adjustment regions of the second display image are made narrower than those of the first display image in accordance with the screen adjustment information.

According to the 3rd aspect of the present invention, in the image display system according to the 1st or 2nd aspect, it is preferred that the video output unit outputs a calibration image as the video signal before the screen adjustment information is acquired by the screen adjustment information acquisition unit, wherein at least one of a brightness and a hue of the calibration image is different from that of the size adjustment region by a predetermined value or more.

According to the 4th aspect of the present invention, in the image display system according to any one of the 1st through 3rd aspects, it is preferred that the screen adjustment information includes information about widths of the size adjustment regions or information about a scaling factor of expansion of a video region of the video signal.

According to the 5th aspect of the present invention, the image display system according to any one of the 1st through 4th aspects, it has: a database in which identification information used for identifying a combination of the display device and the information terminal, and the screen adjustment information are registered in correspondence with each other; a screen adjustment information generator that detects the size adjustment regions in the first display image transmitted by the image transmitter, and generates screen adjustment information that makes the detected size adjustment regions narrower; and a screen adjustment information register that registers the screen adjustment information generated by the screen adjustment information generator in the database, in correspondence with the identification information, wherein if the screen adjustment information about the combination of the information terminal and the display device is stored in the database, the screen adjustment information acquisition unit of the information terminal acquires the screen adjustment information from the database; and if the screen adjustment information about the combination of the information terminal and the display device is not stored in the database, the screen adjustment information is generated by the screen adjustment information generator and the screen adjustment information is registered in the database by the screen adjustment information register.

According to the 6th aspect of the present invention, the image display system according to the 5th aspect, further comprises: a server comprising the database, the screen adjustment information generator, and the screen adjustment information register.

According to the 7th aspect of the present invention, the image display system according to any one of the 1st through 6th aspect, it is preferred that: the information terminal further comprises: an application execution unit that executes an application; and a switch determination unit that determines whether the application currently executed by the application execution unit is switched to another application, wherein if it is determined by the switch determination unit that the application currently executed by the application execution unit is switched to another application, the screen adjustment information acquisition unit acquires the screen adjustment information corresponding to the application that is executed after the switching.

According to the 8th aspect of the present invention, an image display method, it is preferred that: an information terminal outputs a video signal to a display device; the display device, to which the video signal is inputted, generates a first display image including size adjustment regions based on the video signal and outputs the first display image to the information terminal; the information terminal acquires screen adjustment information used by the display device to generate a display screen, based on the first display image, and transmits the screen adjustment information to the display device; and the display device generates a second display image based on the screen adjustment information.

According to the 9th aspect of the present invention, in the image display method according to the 8th aspect: the video signal used to generate the first display image is a signal about a video having at least one of a brightness and a hue different from that of the size adjustment regions by a predetermined value or more.

According to the 10th aspect of the present invention, in the image display method according to the 8th or 9th aspect, it is preferred that: the screen adjustment information includes information about widths of the size adjustment regions or information about a scaling factor of expansion of a video region included in the video signal.

According to the 11th aspect of the present invention, the image display method according to any one of the 8th to 10th aspect, it is preferred that: if the screen adjustment information about a combination of the information terminal and the display device is stored in the database, the information terminal acquires the screen adjustment information from the database; and if the screen adjustment information about the combination of the information terminal and the display device is not stored in the database, the information terminal detects the size adjustment regions in the first display image, generates the screen adjustment information that makes the detected size adjustment information narrower, and registers the generated screen adjustment information in the database in correspondence with the combination of the information terminal and the display device.

According to the 12th aspect of the present invention, the image display method according to any one of the 8th to 11th aspect, it is preferred that: the information terminal can execute an application and determines whether the currently executed application is switched to another application; if it is determined that the currently executed application is switched to another application, the information terminal acquires the screen adjustment information corresponding to the application that is executed after the switching.

According to the 13th aspect of the present invention, a display device comprises: a display control unit that generates a first display image, based on a video signal outputted from an information terminal; and an image transmitter that transmits the first display image generated by the display control unit to the information terminal, wherein the display control unit generates a second display image after receiving, from the information terminal, screen adjustment information that is acquired by the information terminal based on the first display image transmitted by the image transmitter.

According to the 14th aspect of the present invention, a display device comprises: a display control unit that generates a first display image, based on a video signal outputted from an information terminal; and a screen adjustment information generator that generates screen adjustment information used by the display control unit to generate a display screen, based on the first display image, wherein the display control unit generates a second display image, based on the screen adjustment information generated by the screen adjustment information generator.

Advantageous Effects of Invention

According to the present invention, the user can comfortably view a video.

BRIEF DESCRIPTION OF DRAWINGS

FIG. 3 is a view illustrating one example of screens displayed on a display unit of the information terminal and on a display unit of the display device.

FIG. 5 is a view used for explaining size adjustment regions (black strip regions).

FIG. 6 is a view illustrating one example of a data format of screen adjustment information in the first embodiment.

FIG. 9 is a view illustrating one example of a data format of screen adjustment information according to a second embodiment.

FIG. 13 is a flowchart of an initial operation of a cooperation function of an in-vehicle device 1 and a portable terminal 2 in the image display system according to the third embodiment.

DESCRIPTION OF EMBODIMENTS

First Embodiment

Figure 1:
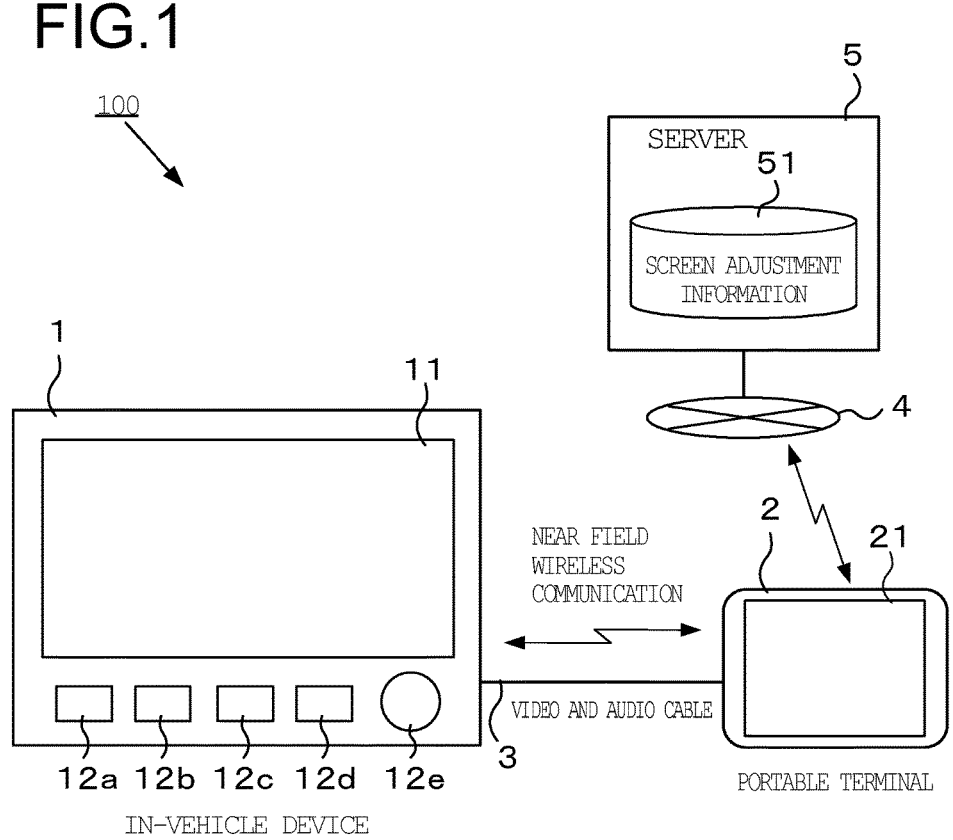
FIG. 1 is a view illustrating a configuration of an image display system according to a first embodiment of the present invention.

FIG. 1 is a view illustrating a configuration of an image display system according to one embodiment of the present invention. The image display system 100 illustrated in FIG. 1 comprises an in-vehicle device 1, a portable terminal 2, and a server 5. The in-vehicle device 1 and the portable terminal 2 are connected to each other via near field wireless communication and wired communication through a video and audio cable 3. The near field wireless communication performed between the in-vehicle device 1 and the portable terminal 2 may be in compliance with Bluetooth (registered trademark) standard, for example. The wired communication through the video and audio cable 3 may be in compliance with HDMI (High-Definition Multimedia Interface) (registered trademark) standard, for example.

The in-vehicle device 1 is installed in a vehicle, specifically in an instrument panel of a vehicle, for example. The in-vehicle device 1 is provided with a display unit 11 and operation keys (operation switches) 12a, 12b, 12c, 12d, and 12e. The display unit 11 is a display monitor on which a variety of images (still images, moving images, videos) can be displayed. The display unit 11 is constituted by a liquid crystal display, for example. The operation keys 12a to 12e are operation switches for detecting user input operations and have different functions assigned thereto depending on a process currently executed by the in-vehicle device 1. The user can operate an operation key among the operation keys 12a to 12e to cause the in-vehicle device 1 to execute a desired function. Although the operation keys 12a to 12d are push button switches and the operation key 12e is a dial switch that is rotatable clockwise and anticlockwise in the example illustrated in FIG. 1, arrangement, structure, number, and other configuration of the operation keys are not limited to this example. The display unit 11 may be a touch panel display monitor and some or all of the operation keys may be omitted.

The portable terminal 2 is a portable information terminal that can be carried by the user, such as a mobile phone, a smart phone, or a tablet PC. The portable terminal 2 is provided with a display unit 21. The display unit 21 is a touch panel display monitor on which a variety of images (still images, moving images, videos) can be displayed, and the display unit 21 is constituted by a combination of a touch sensor for detecting a touched position and a liquid crystal display, for example. The user can touch a certain position on the display unit 21 with his/her finger or the like, depending on a content of an image displayed on the display unit 2, to cause the portable terminal 2 to execute a desired function. Although the display unit 21 is illustrated here as a touch panel display monitor, the display unit 21 may be an ordinary display monitor, instead of the touch panel display monitor. In such a case, it is preferable that the portable terminal 2 is provided with operation switches depending on a content of a process executed by the portable terminal 2. Alternatively, the display unit 21 may be a touch panel display monitor and the portable terminal 2 may be further provided with operation switches corresponding to predetermined operations.

The portable terminal 2 may wirelessly communicate with the public communication line network 4, which is constructed by a mobile telephone network, Internet, or other network, so that the portable terminal 2 can be connected to the server 5 via a public communication line network 4. The server 5 is a manager that stores and manages a database 51 for screen adjustment information described below in detail.

Figure 2:
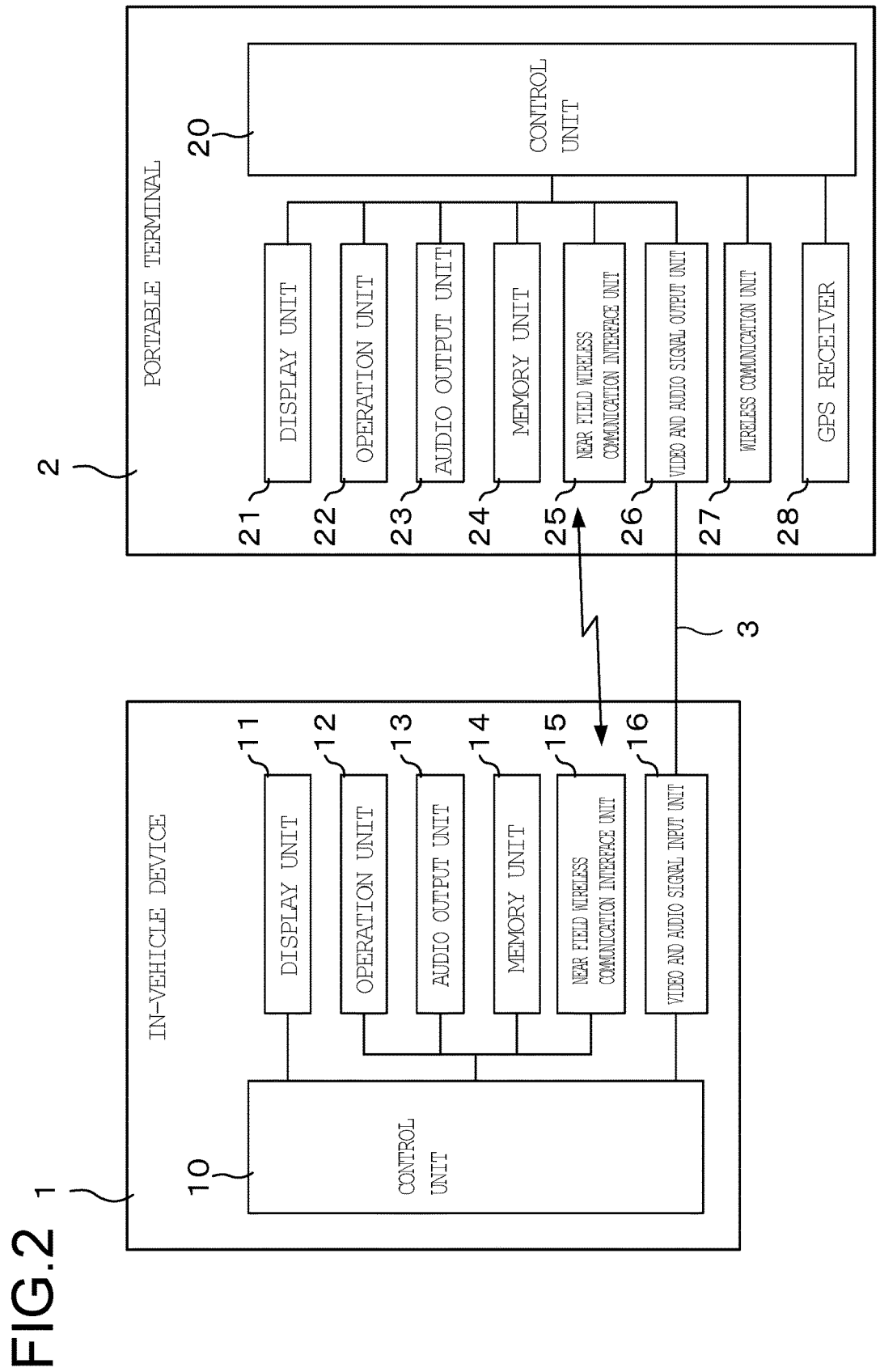
FIG. 2 is a block view illustrating a configuration of a display device and an information terminal according to the first embodiment of the present invention.

FIG. 2 is a block view illustrating a configuration of the in-vehicle device 1 and the portable terminal 2. As illustrated in FIG. 2, the in-vehicle device 1 has a control unit 10, the display unit 11, an operation unit 12, an audio output unit 13, a memory unit 14, a near field wireless communication interface unit 15, and a video and audio signal input unit 16. The portable terminal 2 has a control unit 20, the display unit 21, an operation unit 22, an audio output unit 23, a memory unit 24, a near field wireless communication interface unit 25, a video and audio signal output unit 26, a wireless communication unit 27, and a Global Positioning System (GPS) receiver 28.

In the in-vehicle device 1, the control unit 10 is constituted of microprocessors and a variety of peripheral circuits, RAMs, ROMs, and the like. The control unit 10 executes control programs recorded in the memory unit 14 to achieve respective functions. For example, the control unit 10 achieves a display control function of generating a display image on the basis of video data and causing the display unit 11 to display the display image.

The display unit 11 is a display monitor configured by a liquid crystal display, for example, as described above with reference to FIG. 1. The operation unit 12 is a switch for detecting user input operations and is embodied by the operation keys 12a to 12e illustrated in FIG. 1, for example. The display unit 11 may be a touch panel display monitor as described above so that the display unit 11 and the operation unit 12 may be integrated. A content of an user input operation performed on the operation unit 12 is outputted to the control unit 10 and reflected in a process performed by the control unit 10.

The audio output unit 13 has an amplifier, a speaker, and other components so that a variety of sounds can be outputted under control of the control unit 10. For example, music playback of music data that is read out from the portable terminal 2 or recording media (not shown), or navigation voice for navigating the vehicle to a destination is outputted from the audio output unit 13.

The memory unit 14 is a nonvolatile data storage and is embodied by a hard disc drive (HDD), a flash memory, or other storage. The memory unit 14 has a variety of data stored therein, including the aforementioned control programs used in the control unit 10 and identification information of the in-vehicle device 1. The identification information of the in-vehicle device 1 is information for identifying the model of the in-vehicle device 1, including information about the model number of the in-vehicle device 1, for example. Data is read and written from/to the memory unit 14 under control of the control unit 10, as required.

The near field wireless communication interface unit 15 performs an interface process required for performing the near field wireless communication between the in-vehicle device 1 and the portable terminal 2, under control of the control unit 10. For example, the near field wireless communication interface unit 15 converts information outputted from the control unit 10 into information having a predetermined wireless signal format to transmit the information to the portable terminal 2, and receives information having a predetermined wireless signal format outputted from the portable terminal 2 to output the information to the control unit 10. The near field wireless communication interface unit 15 performs the interface process in compliance with a predetermined communication standard, such as Bluetooth. The process performed by the near field wireless communication interface unit 15 establishes a predetermined near field wireless communication interface between the in-vehicle device 1 and the portable terminal 2, through which information is inputted/outputted.

The video and audio signal input unit 16 converts video signals and audio signals inputted from the portable terminal 2 through the video and audio cable 3, respectively, into video data for screen display and audio data for audio output and then outputs the data to the control unit 10. The control unit 10 generates a display image to be displayed in full screen size on the display unit 11 on the basis of the video data outputted by the video and audio signal input unit 16 and causes the display unit 11 to display the display image, with the display control function. Furthermore, the control unit 10 causes the audio output unit 13 to output sounds on the basis of the audio data outputted by the video and audio signal input unit 16. The process performed by the video and audio signal input unit 16 allows the video signals and the audio signals from the portable terminal 2 to be inputted to the in-vehicle device 1 through the video and audio cable 3 which is a wired communication interface.

In the portable terminal 2, the control unit 20 is constituted of microprocessors and a variety of peripheral circuits, RAMs, ROMs, and the like in the same manner as the control unit 10 of the in-vehicle device 1. The control unit 20 executes a variety of processes based on control programs recorded in the memory unit 24.

The display unit 21 is a touch panel display monitor as described above. The operation unit 22 is an unit for detecting user input operations. Although the display unit 21 and the operation unit 22 are shown as separate components in FIG. 2, the operation unit 22 is integrated with the touch panel display unit 21 in a practical structure. Alternatively, if the operation switches are provided in the portable terminal 2 as described above, the operation switches correspond to the operation unit 22. A content of an user input operation performed on the operation unit 22 is outputted to the control unit 20 and reflected in a process performed by the control unit 20.

The audio output unit 23 has an amplifier, a speaker, and other components so that a variety of sounds can be outputted under control of the control unit 20. For example, when one makes a call using the portable terminal 2, voice of the other party on the call is outputted from the audio output unit 23.

The memory unit 24 is a nonvolatile data storage, which is the same as the memory unit 14 of the in-vehicle device 1, and stores a variety of data for use in a process of the control unit 20. The memory unit 24 stores a variety of application programs (hereinafter simply referred to as "applications") that have been previously obtained by the user. The user can select any application among the variety of applications stored in the memory unit 24 to cause the control unit 20 to execute the application, in order to achieve different functions in the portable terminal 2. The memory unit 24 also stores identification information for identifying the model of the portable terminal 2 such as the model number of the portable terminal 2, a calibration image described below in detail, and other information.

The near field wireless communication interface unit 25 performs an interface process in compliance with a predetermined communication standard in the same manner as the near field wireless communication interface unit 15 of the in-vehicle device 1. In other words, the near field wireless communication interface unit 15 and the near field wireless communication interface unit 25 exchange information via wireless communication so that the near field wireless communication interface between the in-vehicle device 1 and the portable terminal 2 is established, through which bidirectional information communication is achieved.

The video and audio signal output unit 26 converts images and sounds generated by the control unit 20, respectively, into video signals and audio signals that are compatible to a predetermined communication standard such as HDMI. The video and audio signal output unit 26 then outputs the signals through the video and audio cable 3 to the in-vehicle device 1. When the video signal and the audio signal are inputted to the video and audio signal input unit 16 in the in-vehicle device 1, the display unit 11 of the in-vehicle device 1 displays the same screen as that displayed on the display unit 21 in the portable terminal 2. In addition, the audio output unit 13 of the in-vehicle device 1 outputs the same sound as that outputted from the audio output unit 23 in the portable terminal 2. Such a function is referred to as video mirroring.

The wireless communication unit 27 performs wireless communication for connecting the portable terminal 2 to the public communication line network 4 in FIG. 1. With the wireless communication performed by the wireless communication unit 27, the portable terminal 2 can make a call with other portable terminals via the public communication line network 4 and also download information such as the above-described screen adjustment information from the server 5, as required.

The GPS receiver 28 receives GPS signals transmitted from GPS satellites and outputs the signals to the control unit 20. The GPS signal includes information about a location at which the GPS satellite transmitted the GPS signal and the time of day of the transmission, as information for determining the current location of the portable terminal 2 and the current time of day. Thus, receiving GPS signals from a predetermined number or more of GPS satellites enables a calculation of the current location and the current time of day in the control unit 20 on the basis of the information.

The in-vehicle device 1 and the portable terminal 2 included in the present image display system have a cooperation function as described below, in a state where they are connected to each other. The use of this cooperation function makes it possible to display a screen currently displayed on the display unit 21 of the portable terminal 2, e.g., a menu screen, also on the display unit 11 of the in-vehicle device 1; to output images and sounds in the in-vehicle device 1 in accordance with an application currently executed in the portable terminal 2; to reflect a content of an user operation performed on the in-vehicle device 1 in an operation of an application currently executed in the portable terminal 2; and so on.

For example, a navigation process for navigating a vehicle to a destination may be performed by an application for navigation being executed in the portable terminal 2. In the navigation process, the portable terminal 2 creates a map screen in which a map around the current location is drawn, and then outputs image information representing the map screen, by means of the video signal described above, from the video and audio signal output unit 26 through the video and audio cable 3 to the video and audio signal input unit 16. This enables transmission of the map screen from the portable terminal 2 to the in-vehicle device 1 and display of the map screen around the current location in the display unit 11 of the in-vehicle device 1. Furthermore, when the user operates the operation unit 12 of the in-vehicle device 1 or the operation unit 22 of the portable terminal 2 to set a destination, a recommended path from a starting location, which may be the current location of the vehicle, to the destination is searched in the portable terminal 2. Then, when the vehicle approaches a navigation point on the recommended path, a navigation voice depending on a traveling direction of the vehicle at the navigation point is transmitted from the portable terminal 2 to the in-vehicle device 1. This allows the navigation voice to be outputted from the audio output unit 13 of the in-vehicle device 1. Here, respective predetermined signals may be outputted from the portable terminal 2 to the in-vehicle device 1 in synchronization with start and end of the output of the navigation voice. In this way, even if radio broadcasting sound, CD playback sound, or other sound is outputted in the in-vehicle device 1, the user can easily hear the navigation voice by reducing a volume of the sound during the output of the navigation voice. Thus, the in-vehicle device 1 gives the user instructions so that the user can drive the vehicle to the destination without losing his/her way, by displaying the map image on the display unit 11 and outputting the navigation voice from the audio output unit 13.

It should be noted that data previously stored in the memory unit 24 of the portable terminal 2 may be used as data required for the portable terminal 2 executing the application for navigation, such as map data. Alternatively, minimum required data may be stored in the memory unit 24 and, once the portable terminal 2 initiates the application for navigation, the portable terminal 2 is connected to a predetermined server with the wireless communication unit 27 to acquire necessary data as appropriate.

The portable terminal 2 executes an application selected by the user among the plurality of applications including the application for navigation as described above. The user can select an application to be executed by the portable terminal 2, by operating the operation unit 22 to select the desired application in a menu screen displayed on the display unit 21 of the portable terminal 2. This menu screen displays icons of respective applications, to which the cooperation function is applicable, in an aligned manner. When the user selects an icon in the menu screen with a touch panel operation or the like, an application corresponding to the icon is executed in the portable terminal 2.

Furthermore, the portable terminal 2 transmits the menu screen to the in-vehicle device 1, by means of a video signal from the video and audio signal output unit 26. The in-vehicle device 1 displays the menu screen on the display unit 11 on the basis of the video signal transmitted from the portable terminal 2. When the user selects a desired application in this menu screen with a touch operation on the operation unit 12, which is a part of the touch panel, operation information depending on the touch operation is transmitted from the in-vehicle device 1 to the portable terminal 2 by the near field wireless communication interface unit 15.

FIG. 3 (a) illustrates one example of the menu screen displayed on the display unit 21 of the portable terminal 2. This menu screen displays six icons 81 to 86 for respective applications A, B, C, D, E, and F that can be executed in the portable terminal 2, in an aligned manner.

FIG. 3 (b) illustrates one example of the menu screen that is transmitted to the in-vehicle device 1 and displayed on the display unit 11 of the in-vehicle device 1, with the cooperation function. Also in the menu screen illustrated in FIG. 3 (b), icons 81 to 86 are displayed in an aligned manner. The user can select any of the icons 81 to 86 displayed on the display unit 11 with the operation keys 12a to 12e, for example. When one of the icons 81 to 86 displayed on the display unit 11 is selected, information about the operation content is outputted to the portable terminal 2 so that the selected application is executed in the portable terminal 2.

The operation information transmitted from the in-vehicle device 1 is received by the near field wireless communication interface unit 25 in the portable terminal 2 and then outputted to the control unit 20. On the basis of the thus received operation information, the control unit 20 recognizes which application is selected by the user in the in-vehicle device 1 and executes the selected application. In this way, the user can select a desired application in the in-vehicle device 1 and causes the portable terminal 2 to execute the application, as in the case of using the menu screen displayed on the display unit 21 of the portable terminal 2.

It should be noted that the control unit 20 may execute applications in the foreground or in the background. When an application is executed in the foreground, the application is a subject for image display and operation input in the in-vehicle device 1 and the portable terminal 2. In contrast, when an application is executed in the background, the application is not a subject for image display and operation input in the in-vehicle device 1 and the portable terminal 2, even though a process in accordance with the application is executed by the control unit 20. However, sounds may be outputted from the application currently executed in the background.

In order to achieve the cooperation function as described above with the connection of the in-vehicle device 1 and the portable terminal 2, a so-called application manager is preinstalled and stored in the memory unit 24 in the portable terminal 2. In other words, a plurality of applications including the application manager are stored in the memory unit 24. When the portable terminal 2 is connected to the in-vehicle device 1, the application manager is read out from the memory unit 24 and executed in the control unit 20.

Figure 4:
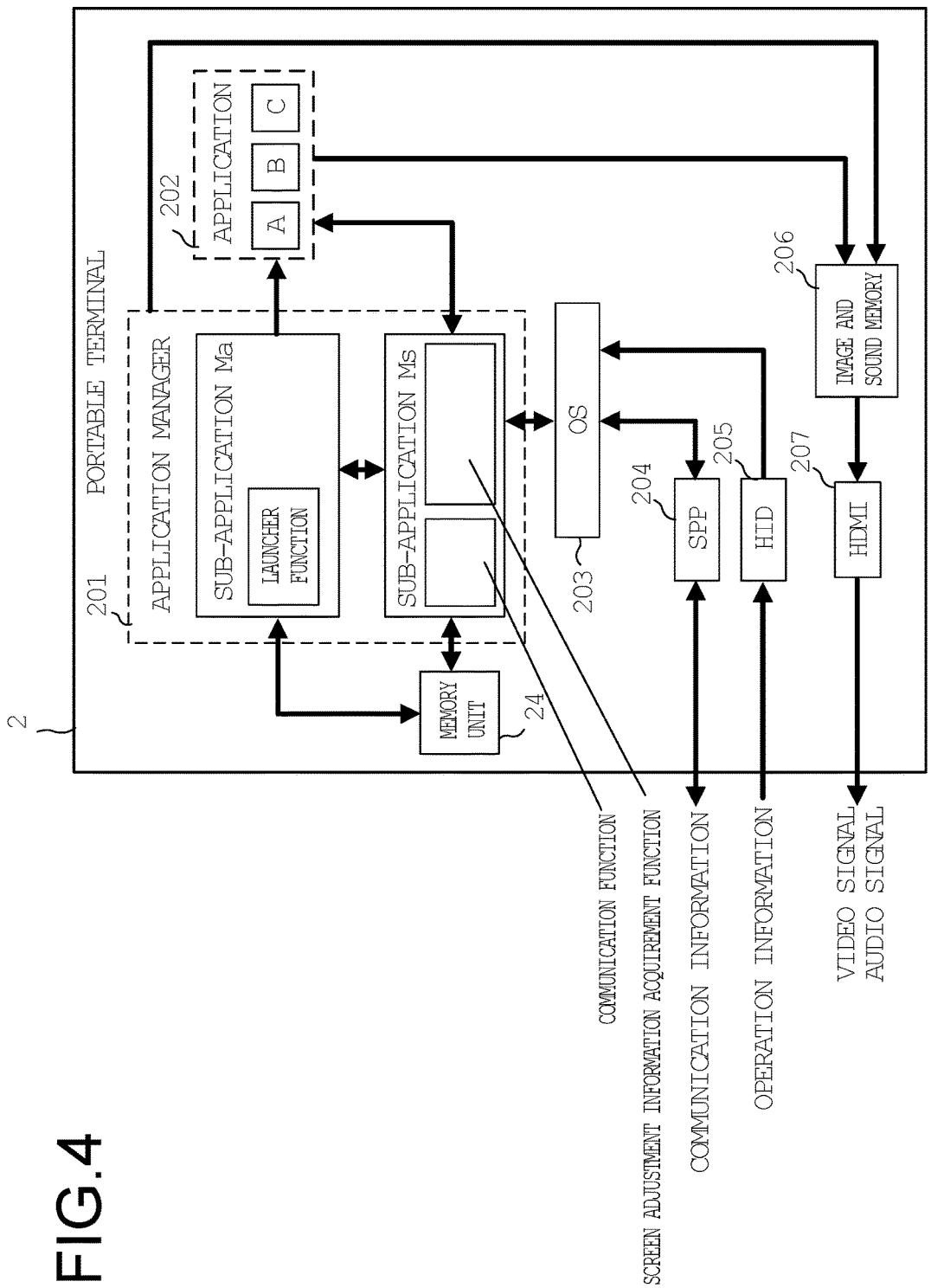
FIG. 4 is a view illustrating a schematic configuration of a software in the information terminal.

FIG. 4 is a view illustrating a schematic configuration of a software in the portable terminal 2. In FIG. 4, an application manager 201 has a sub-application Ma and a sub-application Ms.

The sub-application Ma has a launcher function for launching applications other than the application manager 201. The control unit 20 can utilize this function by executing the sub-application Ma in the foreground. For example, the launcher function may be used to call another application and cause the control unit 20 to execute the application, in place of the sub-application Ma.

The sub-application Ms has a communication function for connecting the portable terminal 2 to the in-vehicle device 1 and a screen adjustment information acquisition function for acquiring screen adjustment information from the database 51 of the server 5. The control unit 20 can utilize these functions by executing the sub-application Ms in the background. For example, the communication function may be used to exchange a variety of communication information required for the cooperation between the portable terminal 2 and the in-vehicle device 1. Furthermore, the screen adjustment information acquisition function may be used to acquire screen adjustment information corresponding to the combination of the in-vehicle device 1 and the portable terminal 2, from the server 5.

As described above, the application manager 201 is configured to be divided into the sub-application Ma that is executed in the foreground in the control unit 20 and the sub-application Ms that is executed in the background in the control unit 20. In this way, an assignment of functions in the application manager 201 can be optimized to be suitable for executing respective sub-applications in the foreground and in the background.

The application manager 201 calls one application among applications 202 with the launcher function of the sub-application Ma. The called application is executed by the control unit 20 in the foreground, in place of the sub-application Ma. It should be noted that the application A is executed in the following description in connection with FIG. 4, for the purpose of explanation.

An operating system (OS) 203 is a software for managing the general operation of the portable terminal 2. When the portable terminal 2 is connected to the in-vehicle device 1, the OS 203 mediates information inputted/outputted between the sub-application Ms executed in the background in the control unit 20 and a Serial Port Profile (SPP) profile 204 and a Human Interface Device Profile (HID) profile 205. The SPP profile 204 and the HID profile 205, which are drivers utilized for the near field wireless communication performed between the in-vehicle device 1 and the portable terminal 2, are standardized as parts of standards used in Bluetooth.

The SPP profile 204 performs a process of transmitting and receiving communication information inputted/outputted between the portable terminal 2 and the in-vehicle device 1, with the communication function of the sub-application Ms. The communication information transmitted from the portable terminal 2 to the in-vehicle device 1 includes screen adjustment information acquired by means of the screen adjustment information acquisition function. The communication information transmitted from the in-vehicle device 1 to the portable terminal 2 includes identification information of the in-vehicle device 1, for example. The HID profile 205 performs a process for receiving operation information that is outputted from the in-vehicle device 1 in accordance with a content of an user operation in the in-vehicle device 1. The contents of the information received by the SPP profile 204 and the HID profile 205 are outputted via the OS 203 to the sub-application Ms and then passed to the currently executed application with the communication function of the sub-application Ms. It should be noted that the information is transmitted and received via the wireless communication between the near field wireless communication interface unit 15 of the in-vehicle device 1 and the near field wireless communication interface unit 25 of the portable terminal 2.

If the sub-application Ma is executed in the foreground in the control unit 20, the sub-application Ma generates an image of the menu screen that allows the user to select an application to be executed, with the launcher function described above. Furthermore, if the application A is executed in the foreground in the control unit 20, the application A generates predetermined images or sounds. These images and sounds are temporarily stored in the sound and image memory 206 and then outputted to a HDMI driver 207.

The HDMI driver 207 performs a process of converting the images and sounds generated by the sub-application Ma or the application A into video signals and audio signals, in accordance with a scheme defined by the HDMI. When converting an image into a video signal, the HDMI driver 207 changes a screen size of the video signal to a predetermined value, e.g., 720×576 pixels. It should be noted that the screen size of the video signal has been set to a value that varies for each model of the portable terminal 2. If an aspect ratio of the image generated by the sub-application Ma or the application A is different from an aspect ratio of a predetermined screen size, vertical and horizontal scaling of the image generated by the sub-application Ma or the application A by the same scaling factor fails to achieve the predetermined screen size. The HDMI driver 207 adjusts the screen size by adding strip-like regions on top and bottom or on right and left of the image to be scaled. For example, when an image having 1280×720 pixels (an aspect ratio of 16:9) illustrated in FIG. 5(a) is to be scaled into an image having 720×576 pixels (an aspect ratio of 10:8), the HDMI driver 207 reduces the size of the image to 720×405 pixels while keeping the aspect ratio of 16:9 unchanged, and then adds strip-like regions having about 86 pixels on top and bottom of the image, as illustrated in FIG. 5(b). Although the strip-like regions are hatched in FIG. 5(b) for the purpose of illustration, the strip-like regions are typically filled with black. The strip-like regions are hereinafter referred to as black strip regions. It should be noted that in the first embodiment, the screen size after scaling in the conversion of an image into a video signal by the HDMI driver 207 is fixed for the same portable terminal 2 regardless of applications generating the image on which the video signal is based.

The video signals and audio signals generated as a result of the conversion process in the HDMI driver 207 are outputted by the video and audio signal output unit 26 through the video and audio cable 3 to the in-vehicle device 1. When receiving the video signal having black strip regions added thereto, the in-vehicle device 1 removes the black strip regions from the video signal and scales the image after the removal into the aspect ratio of the display unit 11 to generate a display image, with the display control function. FIG. 3(b) illustrates one example in which the display image is displayed on the display unit 11. It should be noted that the removal of the black strip regions herein includes not only a process of setting the widths of the black strip regions to exactly zero, but also a process of reducing the widths of the black strip regions to essentially zero.

The screen adjustment information described above is used to generate the display screen with the display control function and particularly to remove the black strip regions from the video signal. FIG. 6 illustrates one example of a data format of the screen adjustment information. The screen adjustment information includes identification information of the in-vehicle device 1, identification information of the portable terminal 2, and information about the widths of the black strip regions. A plurality of pieces of the screen adjustment information are registered in the database 51 illustrated in FIG. 1 and each piece of the screen adjustment information represents widths of black strip regions corresponding to a respective combination of the in-vehicle device 1 and the portable terminal 2. The widths of the black strip regions include widths of black strips to be removed on the top end side, bottom end side, left end side, and right end side of the video signal.

Figure 7:
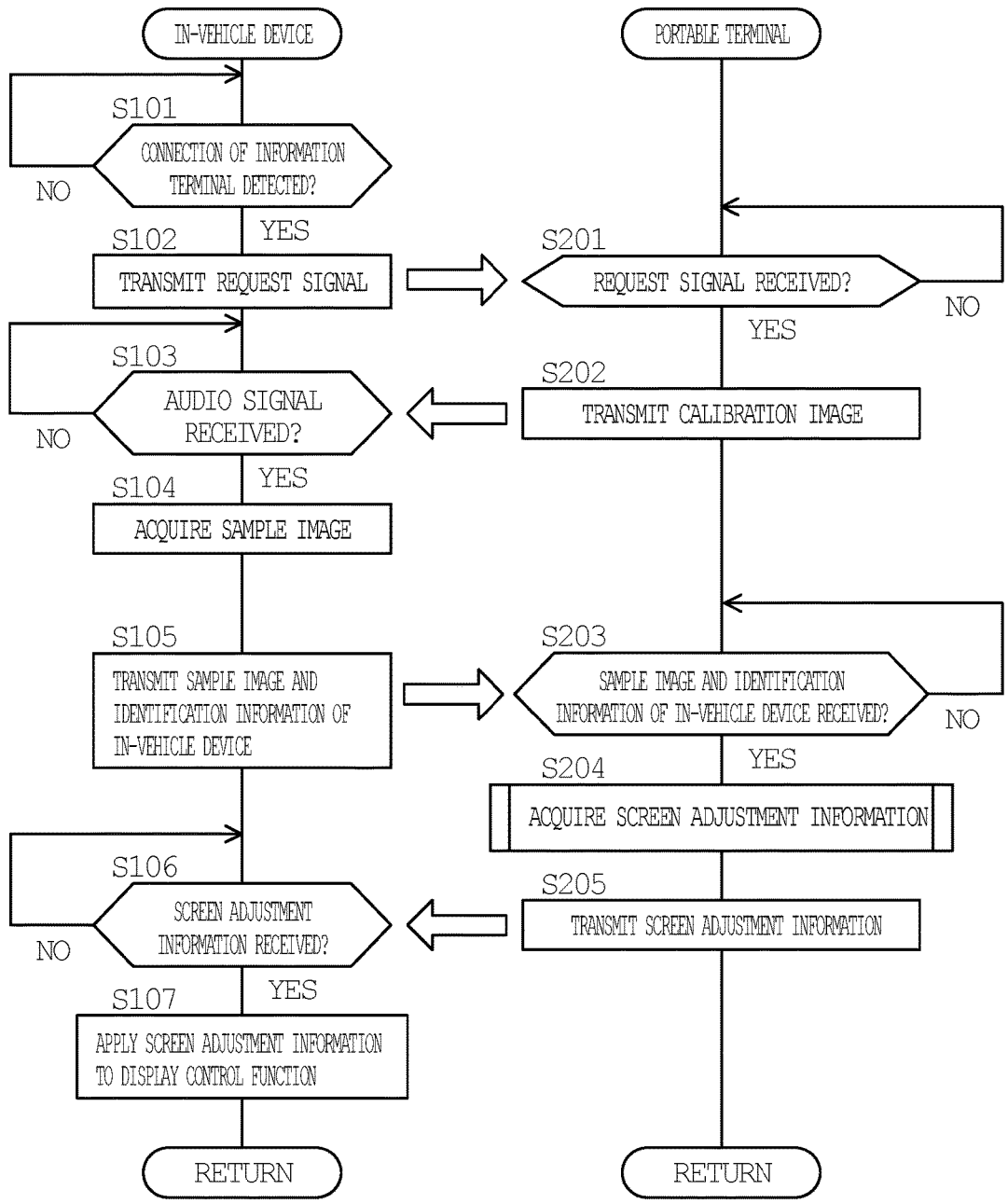
FIG. 7 is a flowchart of an initial operation of a cooperation function of an in-vehicle device 1 and a portable terminal 2 in the image display system according to the first embodiment.

FIG. 7 is a flowchart of an initial operation of the cooperation function of the in-vehicle device 1 and the portable terminal 2 in the image display system according to the first embodiment. The operation illustrated in FIG. 7 starts while the in-vehicle device 1 and the portable terminal 2 have been activated. The operation is performed by the control unit 10 of the in-vehicle device 1 and the control unit 20 of the portable terminal 2 cooperating with each other.

With the start of the operation in FIG. 7, the control unit 10 of the in-vehicle device 1 proceeds to step S101 where it is determined whether connection of the portable terminal 2 is detected. The control unit 10 repeats the determination of step S101 until the connection of the portable terminal 2 is detected. After the detection of the connection of the portable terminal 2, the control unit 10 proceeds to step S102 where a request signal is transmitted via the near field wireless communication interface unit 15 to the portable terminal 2 in order to request transmission of a video signal. Thereafter, the control unit 10 proceeds to step S103 where it is determined whether the video signal is received. The control unit 10 repeats the determination of step S103 until the video signal is received.

With the start of the operation in FIG. 7, the control unit 20 of the portable terminal 2 proceeds to step S201 where it is determined whether a request signal is received. The control unit 20 repeats the process of step S201 until the request signal transmitted in step S102 is received. After receiving the request signal via the near field wireless communication interface unit 25 in step S201, the control unit 20 proceeds to step S202 where the video signal representing a completely white calibration image is transmitted via the video and audio signal output unit 26 to the in-vehicle device 1. For this video signal, the HDMI driver 207 adds black strip regions on top and bottom or on right and left of the white calibration image. It should be noted that the calibration image is stored in the memory unit 24 of the portable terminal 2.

When the control unit 10 of the in-vehicle device 1 receives the video signal representing the calibration image via the video and audio signal input unit 16, the determination result of step S103 is Yes and the control unit 10 proceeds to step S104. In step S104, the control unit 10 generates a display image without removing the black strip regions from the video signal to obtain the generated display image, with the display control function. Here, the display image that is generated with the display control function is referred to as a sample image. In step S105, the control unit 10 transmits the sample image and the identification information of the in-vehicle device 1, which is stored in the memory unit 14, via the near field wireless communication interface unit 15 to the portable terminal 2. Thereafter, the control unit 10 proceeds to step S106 where it is determined whether screen adjustment information is received. The control unit 10 repeats the determination of step S106 until the screen adjustment information is received.

After the completion of the operation in step S202, the control unit 20 of the portable terminal 2 proceeds to step S203 where it is determined whether the sample image and the identification information of the in-vehicle device 1 are received. The control unit 20 repeats the process of step S203 until the sample image and the identification information of the in-vehicle device 1 are received. Once the control unit 10 of the in-vehicle device 1 transmits the sample image and the identification information of the in-vehicle device 1 in step S105, the control unit 20 receives the information via the near field wireless communication interface unit 25. Then, the determination result of step S203 is Yes and the control unit 20 proceeds to step S204.

In step S204, the control unit 20 of the portable terminal 2 acquires the screen adjustment information from the server 5 on the basis of the sample image and the identification information of the in-vehicle device 1 received in step S203 and the identification information of the portable terminal 2 stored in the memory unit 24. The process in step S204 will be described below with reference to FIG. 8. In step S205, the control unit 20 of the portable terminal 2 transmits the screen adjustment information acquired in step S204 via the near field wireless communication interface unit 25 to the in-vehicle device 1 and ends the initial operation.

When the control unit 10 of the in-vehicle device 1 receives the screen adjustment information via the near field wireless communication interface unit 15, the determination result of step S106 is then Yes. The control unit 10 proceeds to step S107 where the received screen adjustment information is applied to the display control function, and then ends the initial operation. After step S107, the control unit 10 removes the black strip regions from the video signal received from the portable terminal 2 on the basis of the screen adjustment information and then scales the image after the removal to generate a display image, with the display control function.

Figure 8:
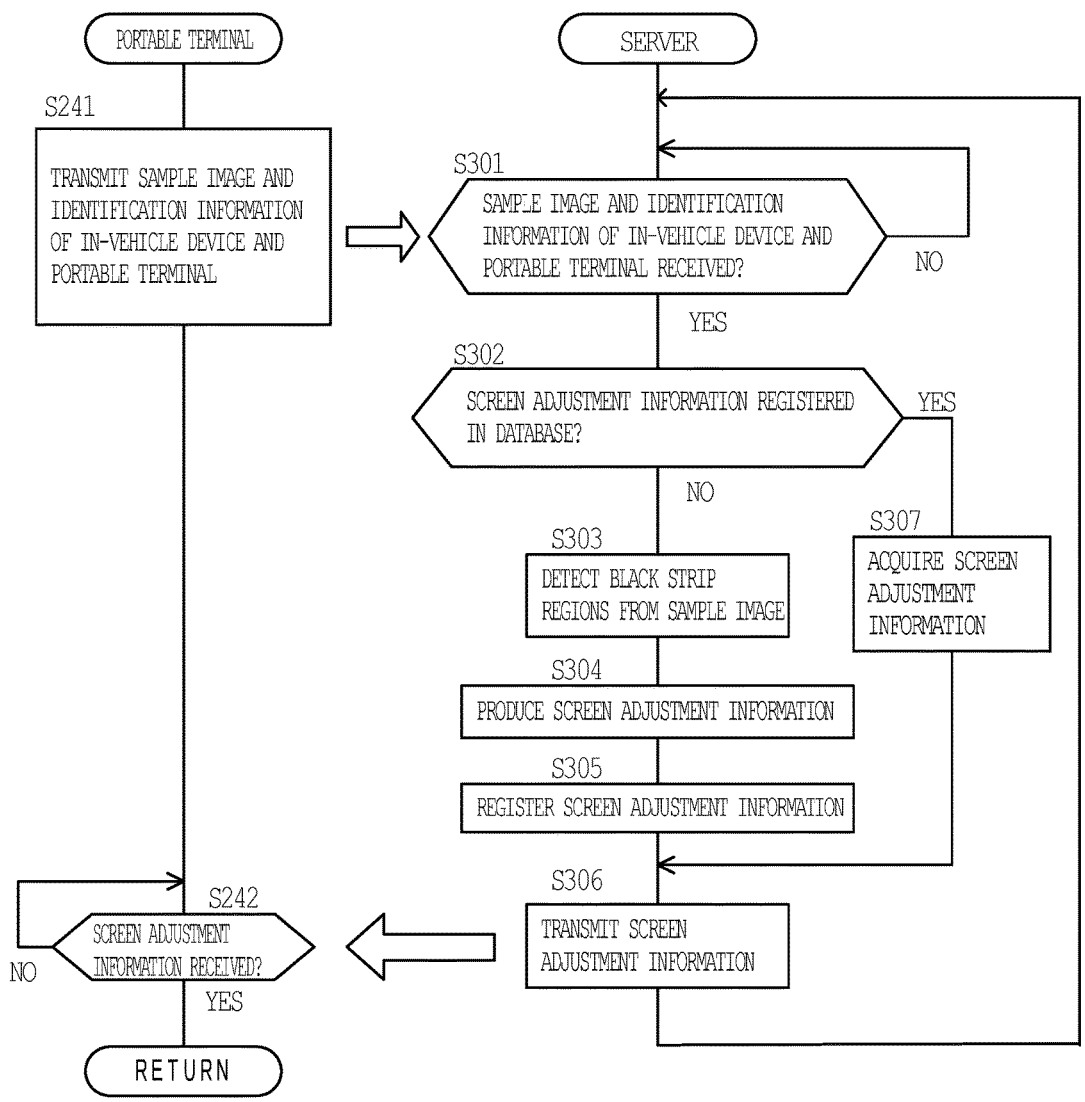
FIG. 8 is a flowchart of a process of step S204 in FIG. 7.

FIG. 8 is a flowchart of a process of step S204. The process illustrated in FIG. 8 is executed by the control unit 20 of the portable terminal 2 and the server 5 cooperating with each other. At the time of the start of the process in FIG. 8, the server 5 has been activated and is executing a process in step S301. In S301, the server 5 determines whether the information about the sample image and the identification information of the in-vehicle device 1 and the portable terminal 2 are received. The server 5 repeats the process of step S301 until the information is received. In step S241, the control unit 20 of the portable terminal 2 transmits the sample image and the identification information of the in-vehicle device 1 received in step S203 of FIG. 7 and the identification information of the portable terminal 2 stored in the memory unit 24 to the server 5. When the server 5 receives the information transmitted in step S241, the determination result of step S301 is then Yes and the server 5 proceeds to step S302.

In step S302, the server 5 determines whether screen adjustment information corresponding to the identification information of the in-vehicle device 1 and the identification information of the portable terminal 2 received in step S301 is registered in the database 51. The server 5 retrieves the screen adjustment information corresponding to the combination of the identification information of the in-vehicle device 1 and the identification information of the portable terminal 2, in the database 51. If the screen adjustment information corresponding to the identification information of the in-vehicle device 1 and the identification information of the portable terminal 2 is registered in the database 51, the server 5 acquires the screen adjustment information by means of the retrieval in step S307 and proceeds to step S306 where the screen adjustment information is transmitted to the portable terminal 2. If the screen adjustment information is not registered in the database 51 and the screen adjustment information is therefore not acquired by means of the retrieval, the server 5 proceeds to step S303.

In step S303, the server 5 detects black strip regions from the sample image. The detection of the black strip regions may be, for example, a judgement of whether a value of a brightness signal is equal to or higher than a predetermined value for every pixel in the sample image so that regions having a brightness signal having a value lower than the predetermined value are detected as the black strip regions. The detection may also be a detection of borders between black strip regions and other image regions by performing an edge detection process on the sample image. Since the calibration image is completely white, the calibration image and the black strip regions are reliably distinguishable so that the black strip regions can be detected with a high accuracy.

In step S304, the server 5 calculates widths of black strip regions detected on the top end side, the bottom end side, the left end side, and the right end side of the sample image in terms of the number of pixels, to generate the screen adjustment information.

In step S305, the server 5 registers the screen adjustment information generated in step S304 in the database 51 as screen adjustment information in correspondence with the identification information of the in-vehicle device 1 and the identification information of the portable terminal 2. Thereafter, it is not necessary to again generate screen adjustment information for the same combination of the in-vehicle device 1 and the portable terminal 2, and the screen adjustment information registered in the database 51 can be used.

In step S306, the server 5 transmits the screen adjustment information generated in step S304 to the in-vehicle device 1 and returns to step S301.

In step S242, the control unit 20 of the portable terminal 2 receives the screen adjustment information transmitted in step S306. The control unit 20 thus completes the screen adjustment information acquisition operation. The control unit 20 ends the operation of FIG. 8.

According to the first embodiment described above, the following operational advantages can be achieved.

(1) The image display system according to the first embodiment of the present invention comprises the in-vehicle device 1 having the display unit 11 and the portable terminal 2. The in-vehicle device 1 has the control unit 10 that achieves the display control function. The control unit 10 generates a sample image having size adjustment regions, i.e., black strip regions added thereto on the basis of the video signal outputted by the portable terminal 2 (step S104) and outputs the sample image via the near field wireless communication interface unit 15 to the portable terminal 2 (step S105), with the display control function. The portable terminal 2 has the control unit 20 that achieves the screen adjustment information acquisition function. The control unit 20 outputs the video signal representing the calibration image via the HDMI driver 207 to the in-vehicle device 1 (step S202), acquires the screen adjustment information on the basis of the sample image with the screen adjustment information acquisition function (step S204), and transmits the screen adjustment information via the near field wireless communication interface unit 25 to the in-vehicle device 1 (step S205). The control unit 10 of the in-vehicle device 1 generates the display image having black strip regions that are made narrower by a predetermined amount on the basis of the screen adjustment information transmitted by the portable terminal 2, with the display control function. Thus, the user can comfortably view the video.

(2) The control unit 10 of the in-vehicle device 1 generates the sample image before receiving the screen adjustment information from the portable terminal 2, and generates a display image after receiving the screen adjustment information from the portable terminal 2, wherein the display image has black strip regions that are narrower than those of the sample image—e.g., having no black strip regions—in accordance with the screen adjustment information, with the display control function. Since no sample image is generated after the screen adjustment information is acquired, the screen adjustment information does not vary from frame to frame and thus the video does not expand or contract during playback. Consequently, the user can comfortably view the video.

Particularly in a display device mounted on a vehicle, expansion and contraction of the video during playback can distract the attention of the driver and thus cause the driver to take his/her eyes off the road. According to the present invention, it is possible to avoid distraction of the attention of the driver and prevent the driver to take his/her eyes off the road since the video does not expand and contract during playback.

(3) Before the screen adjustment information is acquired with the screen adjustment information acquisition function, the control unit 20 of the portable terminal 2 transmits the video signal representing the completely white image as the video signal of the calibration image (step S202). The color of the image, or white, is complementary to the color of the black strip regions. The black strip regions can therefore be detected from the sample image with a high accuracy.

(4) The screen adjustment information includes information about the widths of the black strip regions. Therefore, a region to be extracted from the video signal when the in-vehicle device 1 removes the black strip regions can be easily determined and the scaling factor can be easily calculated.

(5) The image display system 100 has the server 5 having the database 51. In the database 51, the screen adjustment information is stored in correspondence with each combination of the in-vehicle device 1 and the portable terminal 2. If the screen adjustment information corresponding to the combination of the in-vehicle device 1 and the portable terminal 2 transmitted in step S241 of FIG. 8 is stored in the database 51, the server 5 acquires the screen adjustment information from the database 51 (step S307 in FIG. 8). If the screen adjustment information corresponding to the combination of the in-vehicle device 1 and the portable terminal 2 is not stored in the database 51, the server 5 detects the black strip regions from the sample image (step S303) and generates the screen adjustment information on the basis of the detection result (step S304) to register the screen adjustment information in the database 51 (step S305). Therefore, accumulation of the screen adjustment information corresponding to combinations of the in-vehicle device 1 and the portable terminal 2 in the database 51 prevents the repetition of the same calculation and improves a processing efficiency of the whole image display system.

(6) As illustrated in FIG. 8, the server 5 is used to detect the black strip regions from the sample image in order to generate the screen adjustment information. Processing loads on the in-vehicle device 1 and the portable terminal 2 can thus be reduced.

Second Embodiment

An image display system according to a second embodiment will be described. The image display system according to the second embodiment comprises the same configuration as that of the image display system 100 according to the first embodiment illustrated in FIG. 1. Specifically, the image display system according to the second embodiment comprises an in-vehicle device 1, a portable terminal 2, and a server 5. The configuration of the in-vehicle device 1 and the portable terminal 2 in the second embodiment is the same as the configuration of the in-vehicle device 1 and the portable terminal 2 in the first embodiment illustrated in FIG. 2. In the first embodiment, the screen size after scaling in the conversion of an image into a video signal by the HDMI driver 207 is fixed regardless of applications generating the image on which the video signal is based. The second embodiment of the present invention contemplates a case where the screen size after scaling in the conversion of the image into the video signal by the HDMI driver 207 is set for each application, so that the portable terminal 2 acquires different screen adjustment information for each application.

A screen adjustment information acquisition function in the second embodiment has a function of monitoring which application is executed in the foreground, wherein screen adjustment information is acquired each time an application executed in the foreground is switched to another application.

FIG. 9 is one example of a data format of the screen adjustment information stored in the database 51 of the server 5 in the second embodiment. The screen adjustment information in the second embodiment includes identification information of applications, in addition to the identification information of the in-vehicle device 1, the identification information of the portable terminal 2, and the information about the widths of the black strip regions. By additionally including the identification information of applications in the screen adjustment information, different screen adjustment information can be managed from application to application.

Figure 10:
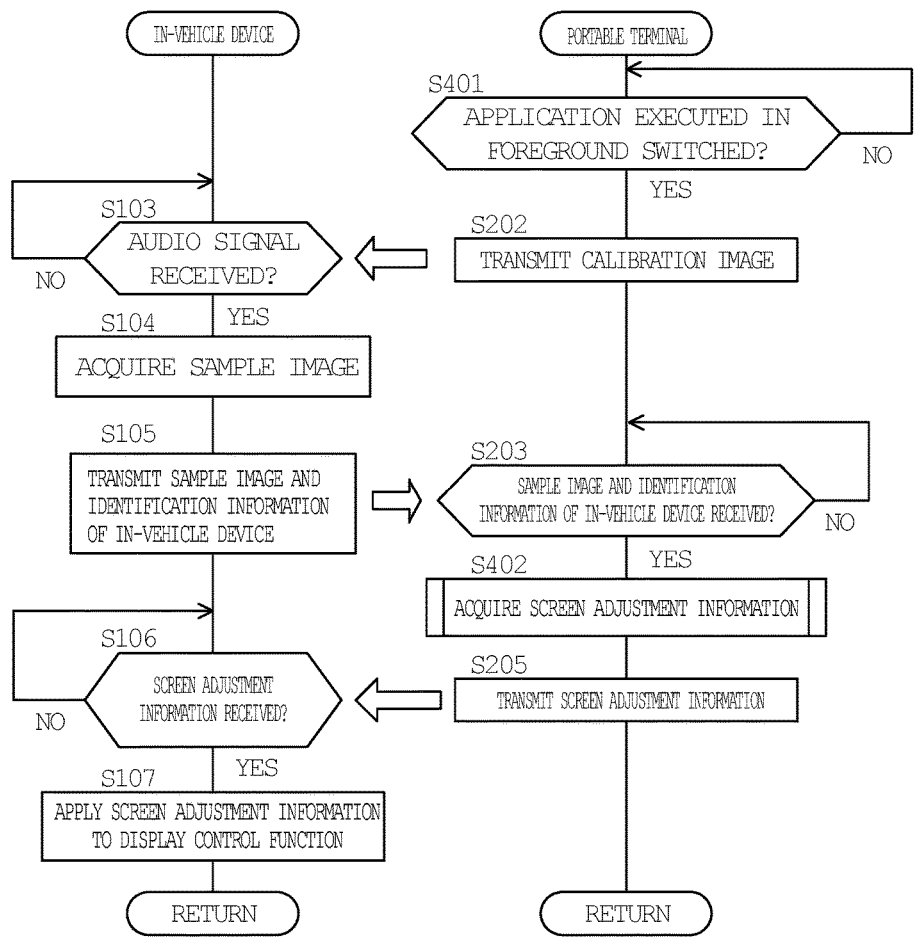
FIG. 10 is a flowchart of a screen adjustment information acquisition function in the second embodiment.

FIG. 10 is a flowchart of the screen adjustment information acquisition function in the second embodiment. The operation illustrated in FIG. 10 starts while the initial operation illustrated in FIG. 7 has been performed, i.e., the screen adjustment information has been applied to the display control function for the application executed in the foreground. The operation is performed by the control unit 10 of the in-vehicle device 1 and the control unit 20 of the portable terminal 2 cooperating with each other. It should be noted that operation steps illustrated in FIG. 10 that are the same as those illustrated in FIG. 7 are denoted by the same reference numerals and explanation thereof will be omitted.

With the start of the operation in FIG. 10, the control unit 20 of the portable terminal 2 proceeds to step S401. In step S401, the control unit 20 determines whether the application executed in the foreground is switched to another application. The control unit 20 repeats the operation of step S401 until the application executed in the foreground is switched to another application. With the switching of the application executed in the foreground, the control unit 20 proceeds to step S202 where a video signal representing a completely white calibration image is transmitted to the in-vehicle device in order to acquire new screen adjustment information. For this video signal, the HDMI driver 207 adds black strip regions on top and bottom or on right and left of the white calibration image.

In step S402, the control unit 20 acquires the screen adjustment information from the server 5 on the basis of the sample image and the identification information of the in-vehicle device 1 received in step S203, the identification information of the portable terminal 2, and the identification information of the application executed in the foreground in the portable terminal 2.

Figure 11:
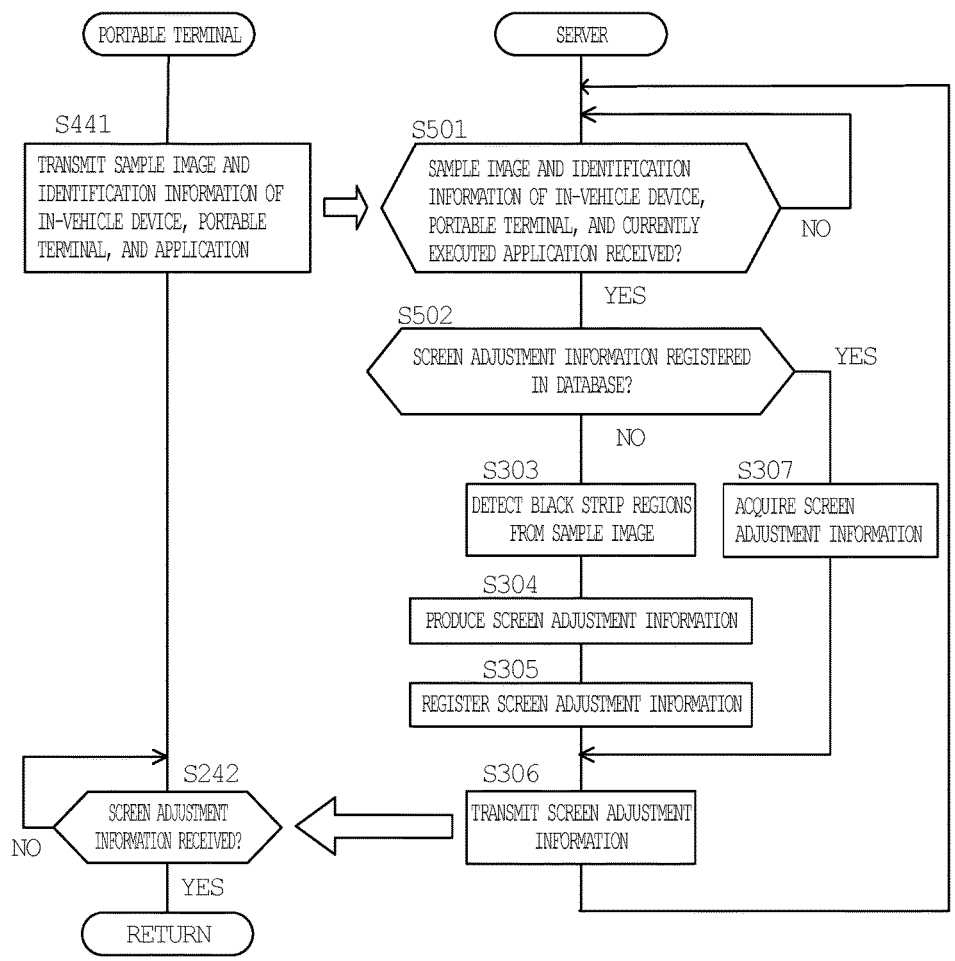
FIG. 11 is a flowchart of a process of step S402 in FIG. 10.

FIG. 11 is a flowchart of a process of step S402. The process illustrated in FIG. 11 is executed by the control unit 20 of the portable terminal 2 and the server 5 cooperating with each other. It should be noted that operation steps illustrated in FIG. 10 that are the same as those illustrated in FIG. 8 are denoted by the same reference numerals and explanation thereof will be omitted.

At the time of the start of the process in FIG. 11, the server 5 has been activated and is executing the process in step S501. In S501, the server 5 determines whether the information about the sample image, the identification information of the in-vehicle device 1 and the portable terminal 2, and the identification information of the application executed in the foreground in the portable terminal 2 are received from the portable terminal 2. The server 5 repeats the process of step S501 until the information is received. In step S441, the control unit 20 of the portable terminal 2 transmits the sample image and the identification information of the in-vehicle device 1 received in step S203 of FIG. 10, the identification information of the portable terminal 2 stored in the memory unit 24, and the identification information of the application executed in the foreground in the portable terminal 2 to the server 5. When the server 5 receives the information transmitted in step S441, the determination result of step S301 is then Yes and the server 5 proceeds to step S502.

In step S502, the server 5 determines whether screen adjustment information corresponding to the identification information of the in-vehicle device 1, the identification information of the portable terminal 2, and the identification information of the application executed in the foreground in the portable terminal 2 received in step S501 is registered in the database 51. The server 5 retrieves the screen adjustment information corresponding to the combination of the identification information of the in-vehicle device 1 and the identification information of the portable terminal 2 received in step S501, in the database 51. If the screen adjustment information corresponding to the identification information of the in-vehicle device 1, the identification information of the portable terminal 2, and the identification information of the application executed in the foreground in the portable terminal 2 is registered in the database 51, the server 5 acquires the screen adjustment information by means of the retrieval in step S307 and transmits the screen adjustment information to the portable terminal 2 in step S306. If the screen adjustment information is not registered in the database 51 and the screen adjustment information is therefore not acquired by means of the retrieval, the server 5 proceeds to step S303.

According to the second embodiment described above, the following operational advantage can be achieved.

(1) In the image display system according to the second embodiment of the present invention, the control unit 20 of the portable terminal 2 executes the application 202 and determines whether the currently executed application is switched to another application, with the screen adjustment information acquisition function (step S401 of FIG. 10). If it is determined that the currently executed application is switched, the control unit 20 acquires the screen adjustment information (step S402 after the determination result of Yes in step S401). The video can thus be appropriately converted even if the screen size after scaling in the conversion of the video data into the video signal is set for each application.

Third Embodiment

Figure 12:
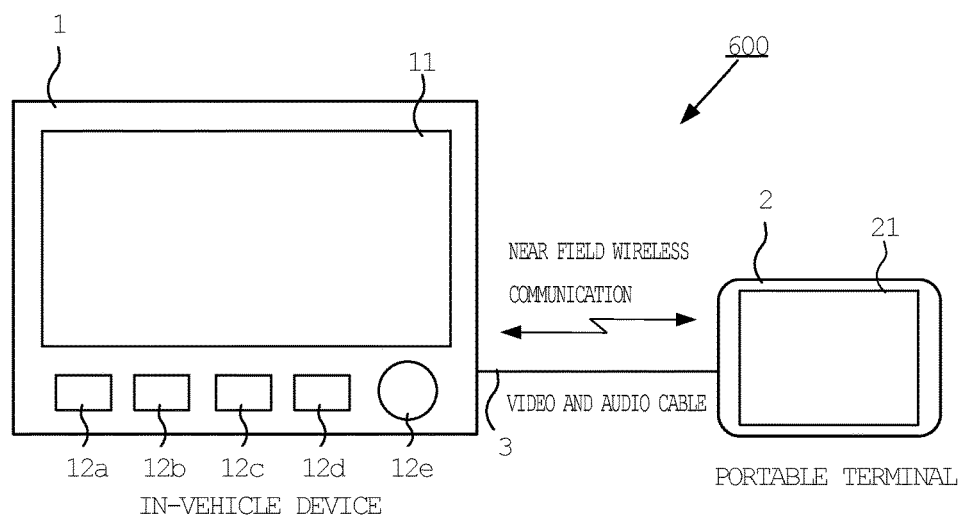
FIG. 12 is a view illustrating a configuration of an image display system according to a third embodiment.

An image display system according to a third embodiment will be described. The image display system according to the third embodiment generates screen adjustment information in the in-vehicle device 1, instead of the server 5. FIG. 12 illustrates a configuration of an image display system 600 according to the third embodiment. The image display system 600 according to the third embodiment comprises an in-vehicle device 1 and a portable terminal 2. The configuration of the in-vehicle device 1 and the portable terminal 2 in the third embodiment is the same as the configuration of the in-vehicle device 1 and the portable terminal 2 in the first embodiment illustrated in FIG. 2.

FIG. 13 is a flowchart of an initial operation of a cooperation function of the in-vehicle device 1 and the portable terminal 2 in the image display system according to the third embodiment. The operation illustrated in FIG. 13 starts while the in-vehicle device 1 and the portable terminal 2 have been activated. The operation is performed by the control unit 10 of the in-vehicle device 1 and the control unit 20 of the portable terminal 2 cooperating with each other. It should be noted that operation steps illustrated in FIG. 10 that are the same as those illustrated in FIGS. 7 and 8 are denoted by the same reference numerals and explanation thereof will be omitted.

In step S701, the control unit 10 of the in-vehicle device 1 detects black strip regions from the sample image. The detection of the black strip regions may be, for example, a judgement of whether a value of a brightness signal is equal to or higher than a predetermined value for every pixel in the sample image so that regions having a brightness signal having a value lower than the predetermined value are detected as the black strip regions. The detection may also be a detection of borders between black strip regions and other image regions by performing an edge detection process on the sample image. Since the calibration image is completely white, the calibration image and the black strip regions are reliably distinguishable so that the black strip regions can be detected with a high accuracy.

In step S702, the control unit 10 calculates widths of black strip regions detected on the top end side, the bottom end side, the left end side, and the right end side of the sample image in step S701 in terms of the number of pixels, to generate the screen adjustment information.

According to the third embodiment described above, the following operational advantages can be achieved.

(1) The in-vehicle device 1 according to the third embodiment of the present invention has the control unit 10 that achieves the display control function. The control unit 10 generates a sample image having size adjustment regions, i.e., black strip regions added thereto on the basis of the video signal outputted by the portable terminal 2 (step S104) and generates screen adjustment information on the basis of the display image (step S701 to S702), with the display control function. Based on the generated screen adjustment information, the in-vehicle device 1 generates a display image having black strip regions that are made narrower by a predetermined amount. Since the screen adjustment information is generated in the in-vehicle device 1, the video can be appropriately converted without the use of the server 5.

The following variations are also within the scope of the present invention and one or more of the variations may be combined with the above-described embodiments.

(First Variation)

Although the screen adjustment information is generated in the server 5 in the first and second embodiments described above and the screen adjustment information is generated in the in-vehicle device 1 in the third embodiment also described above, the screen adjustment information may be generated in the portable terminal 2. Furthermore, the database 51 may be stored in the memory unit 24 of the portable terminal 2 and the portable terminal 2 may act as a manager for the database 51. For example, the operations of steps S302 to S305 and step S307 of FIG. 8, or the operations of steps S303 to S305, step S307, and step S502 of FIG. 11 may be executed by the control unit 20 of the portable terminal 2.

(Second Variation)

Although the server 5 stores the database 51 in the embodiments described above, the server 5 does not necessarily have to store the database 51. For example, after receiving the sample image from the portable terminal 2, the server 5 may skip the determination in step S302 of FIG. 8 or in step S502 of FIG. 11 and detect the black strip regions from the sample image to generate the screen adjustment information. Also in the case of generating the screen adjustment information in the portable terminal 2 as in the first variation described above, the operations of steps S303 and S304 of FIG. 8 or FIG. 11 may be executed by the control unit 20 of the portable terminal 2, without the database 51 being stored in the memory unit 24 of the portable terminal 2, for example.

(Third Variation)

In the third embodiment, the in-vehicle device 1 may comprise the database 51. If the in-vehicle device 1 stores the database 51, the in-vehicle device 1 can acquire the identification information of the portable terminal 2 after the connection of the portable terminal 2 has been detected and before the request signal is transmitted, and then determine whether the screen adjustment information is registered in the database 51. If registered, the in-vehicle device 1 may acquire the screen adjustment information. If not, the in-vehicle device 1 may generate the screen adjustment information.

(Fourth Variation)

In the embodiments described above, the strip-like regions used for the adjustment of the screen size as illustrated in FIG. 5(a) are typically filled with black and referred to as black strip regions. However, the strip-like regions used for the adjustment of the screen size, i.e., the size adjustment regions, are not necessarily filled with black in terms of appearance, but with white or blue, for example. The calibration image only needs to have an appearance that is clearly distinguishable from the appearance of the size adjustment region. For example, if the size adjustment region is white, the calibration image may be filled with black, for example, in terms of appearance. Alternatively, if the size adjustment region exhibits a chromatic color such as blue, a brightness, a hue, or both of the calibration image may be different from that of the size adjustment region by a predetermined value or more, in terms of appearance. For example, if the size adjustment region is bluish purple, the calibration image may be filled with yellow, which is the complementary color of bluish purple. It should be noted that, in the calibration image, only peripheral edges of the image needs to have an appearance that is clearly distinguishable from the size adjustment region. Any appearance of the center part of the image may be acceptable as long as the center part cannot be falsely detected as the size adjustment region. For example, the calibration image may include character information about the specification of the calibration image, character information about the identification information of the portable terminal 2, and the like.

(Fifth Variation)

In the embodiments described above, the screen adjustment information includes information about the widths of the black strip regions. However, the screen adjustment information is not necessarily information about the widths of the black strip regions as long as the control unit 10 of the in-vehicle device 1 can determine the widths of the black strip regions to be removed. For example, the screen adjustment information may include respective scaling factors for vertical and horizontal expansions of the image after removal of the black strip regions from the sample image. For example, the in-vehicle device 1 may calculate the width of the vertical black strip region as y multiplied by $(1-1/a)/2$, wherein a is a vertical scaling factor and y is a vertical size of the sample image. This is also the case for the width of the horizontal black strip region. Furthermore, coordinates of four corners of a region other than the black strip regions in the sample image, i.e., a video region may be used as the screen adjustment information.

(Sixth Variation)

In the embodiment described above, the HDMI driver 207 is included in the schematic configuration of the software in the portable terminal 2 illustrated in FIG. 4. However, instead of or in addition to the HDMI driver 207, a MHL (registered trademark) driver may be included for example, which performs a process of converting images and sounds generated by the sub-application Ma or the applications into video signals and audio signals in compliance with a communication standard other than HDMI.

(Seventh Variation)

The above-described embodiments describe the example where the display unit 11 of the in-vehicle device 1 is a touch panel and the image received from the portable terminal 2 is displayed on the display unit 11. However, the applicable scope of the present invention is not limited to the above-described embodiments. The present invention is applicable to any display device as long as the display device is connected to information terminals such as the portable terminal 2 and an image received from the information terminal is displayed on the touch panel.

(Eighth Variation)

The present invention includes an image display method, wherein: an information terminal outputs a video signal to a display device; a display device, to which the video signal is inputted, generates a first display image including size adjustment regions based on the video signal and outputs the first display image to the information terminal; the information terminal acquires screen adjustment information used by the display device to generate a display screen, based on the first display image, and transmits the screen adjustment information to the display device; and the display device generates a second display image based on the screen adjustment information.

Although the present invention has been described above with reference to the image display system, an invention for an in-vehicle device provided in the image display system is also within the scope of the present invention.

Although various embodiments and variations have been described above, the present invention shall not limited to these examples. Other forms contemplated within the scope of the technical idea of the present invention are also within the scope of the present invention.

The disclosure of the following priority application is herein incorporated by reference:

Japanese Patent Application No. 2014-151994 (filed Jul. 22, 2014)

REFERENCE SIGNS LIST 1 in-vehicle device
2 portable terminal
5 server
10, 20 control unit
11, 21 display unit
12, 22 operation unit
14, 24 memory unit
15, 25 near field wireless communication interface unit
16 video and audio signal input unit
26 video and audio signal output unit
27 wireless communication unit
51 database
100, 600 image display system

The invention claimed is:

1. An image display system comprising:
a display device; and an information terminal,
the display device having at least a first processor that:
generates a first display image having size adjustment regions added thereto, based on a video signal outputted by the information terminal; and
outputs the first display image to the information terminal;
the information terminal having at least a second processor that:
outputs the video signal to the display device;
acquires screen adjustment information to generate a display screen to be displayed on the display device, based on the first display image; and
transmits the screen adjustment information to the display device, wherein
the at least first processor generates a second display image, based on the screen adjustment information;
a database in which identification information used for identifying a combination of the display device and the information terminal, and the screen adjustment information are registered in correspondence with each other;
a screen adjustment information generator that detects the size adjustment regions in the first display image, and generates screen adjustment information that makes the detected size adjustment regions narrower; and
a screen adjustment information register that registers the screen adjustment information generated by the screen adjustment information generator in the database, in correspondence with the identification information, wherein:
if the screen adjustment information about the combination of the information terminal and the display device is stored in the database, the at least second processor of the information terminal acquires the screen adjustment information from the database; and
if the screen adjustment information about the combination of the information terminal and the display device is not stored in the database, the screen adjustment information is generated by the screen adjustment information generator and the screen adjustment information is registered in the database by the screen adjustment information register.

2. The image display system according to claim 1, wherein:
the at least first processor generates the first display image before receiving the screen adjustment information from the information terminal, and generates the second display image as the display screen after receiving the screen adjustment information from the information terminal, wherein the size adjustment regions of the second display image are made narrower than those of the first display image in accordance with the screen adjustment information.

3. The image display system according to claim 1, wherein:
the at least second processor outputs a calibration image as the video signal before the screen adjustment information is acquired, wherein at least one of a brightness and a hue of the calibration image is different from that of the size adjustment regions by a predetermined value or more.

4. The image display system according to claim 1, wherein:
the screen adjustment information includes information about widths of the size adjustment regions or information about a scaling factor of expansion of a video region of the video signal.

5. The image display system according to claim 1, further comprising:
a server comprising the database, the screen adjustment information generator, and the screen adjustment information register.

6. The image display system according to claim 1, wherein:
the at least second processor further:
executes an application; and
determines whether the application currently executed is switched to another application, wherein
if it is determined that the application currently executed is switched to another application, the at least second processor acquires the screen adjustment information corresponding to the application that is executed after the switching.

7. An image display method, wherein:
an information terminal outputs a video signal to a display device;
the display device, to which the video signal is inputted, generates a first display image including size adjustment regions based on the video signal and outputs the first display image to the information terminal;
the information terminal acquires screen adjustment information used by the display device to generate a display screen, based on the first display image, and transmits the screen adjustment information to the display device; and
the display device generates a second display image based on the screen adjustment information, and wherein:
if the screen adjustment information about a combination of the information terminal and the display device is stored in a database, the information terminal acquires the screen adjustment information from the database; and
if the screen adjustment information about the combination of the information terminal and the display device is not stored in the database, the information terminal detects the size adjustment regions in the first display image, generates the screen adjustment information that makes the detected size adjustment information narrower, and registers the generated screen adjustment information in the database in correspondence with the combination of the information terminal and the display device.

8. The image display method according to claim 7, wherein:
the video signal used to generate the first display image is a signal about a video having at least one of a brightness and a hue different from that of the size adjustment regions by a predetermined value or more.

9. The image display method according to claim 7, wherein:
the screen adjustment information includes information about widths of the size adjustment regions or information about a scaling factor of expansion of a video region included in the video signal.

10. The image display method according to claim 7, wherein:
the information terminal can execute an application and determines whether the currently executed application is switched to another application;
if it is determined that the currently executed application is switched to another application, the information terminal acquires the screen adjustment information corresponding to the application that is executed after the switching.

11. A display device comprising:
at least one processor that generates a first display image, based on a video signal outputted from an information terminal; and
a screen adjustment information generator that generates screen adjustment information to generate a display screen, based on the first display image, wherein
the at least one processor generates a second display image, based on the screen adjustment information generated by the screen adjustment information generator, and a screen adjustment information register that registers the screen adjustment information generated by the screen adjustment information generator in a database, wherein
if the screen adjustment information about a combination of an information terminal and the display device is not stored in the database, the screen adjustment information is generated by the screen adjustment information generator and the screen adjustment information is registered in the database by the screen adjustment information register,
in the database, identification information is used for identifying a combination of the display device and the information terminal, and the screen adjustment information are registered in correspondence with each other,
the screen adjustment information generator detects the size adjustment regions in the first display image, and generates screen adjustment information that makes the detected size adjustment regions narrower,
the screen adjustment information register registers the screen adjustment information generated by the screen adjustment information generator in the database in correspondence with the identification information, wherein:
if the screen adjustment information about the combination of the information terminal and the display device is stored in the database, the at least second processor of the information terminal acquires the screen adjustment information from the database; and
if the screen adjustment information about the combination of the information terminal and the display device is not stored in the database, the screen adjustment information is generated by the screen adjustment information generator and the screen adjustment information is registered in the database by the screen adjustment information register.

* * * * *